United States Patent [19]

Boy-Marcotte et al.

[11] Patent Number: 4,515,148
[45] Date of Patent: May 7, 1985

[54] CYLINDRO-PARABOLICAL SOLAR ENERGY COLLECTOR

[75] Inventors: Jean L. M. R. Boy-Marcotte, Orsay; Georges J. Chastang, Lex Clayes Sous Bois; Laurent O. Salvaire, Laval; Christian D. Burnouf, Montsurs, all of France

[73] Assignees: Rossignol S.A., Montsurs; Bertin et Cie, Plaisir, both of France

[21] Appl. No.: 440,745

[22] Filed: Nov. 10, 1982

[30] Foreign Application Priority Data

Nov. 12, 1981 [FR] France .................. 81 21196

[51] Int. Cl.³ ............................................. F24J 3/02
[52] U.S. Cl. ..................................... 126/438; 126/437; 126/418; 126/442; 126/424; 350/628
[58] Field of Search ............... 126/424, 438, 439, 443, 126/451, 437, 418; 350/293, 298, 288, 289, 310

[56] References Cited

U.S. PATENT DOCUMENTS

| 3,052,229 | 9/1962 | Wenger | 126/424 |
| 4,077,392 | 3/1978 | Garner | 126/424 |
| 4,149,523 | 4/1979 | Boy-Marcotte et al. | 126/438 X |
| 4,205,659 | 6/1980 | Beam | 126/438 |
| 4,243,019 | 1/1981 | Severson | 126/438 |
| 4,249,514 | 2/1981 | Jones | 126/438 |
| 4,273,104 | 6/1981 | Uroshevich | 350/293 X |
| 4,337,759 | 7/1982 | Popovich et al. | 126/438 |

FOREIGN PATENT DOCUMENTS

| 2948216 | 6/1981 | Fed. Rep. of Germany | 126/438 |
| 627431 | 12/1926 | France . | |
| 2396245 | 6/1977 | France . | |
| 2376378 | 12/1977 | France . | |
| 2460400 | 7/1979 | France . | |
| 2483064 | 11/1981 | France | 126/438 |

*Primary Examiner*—Margaret A. Focarino
*Attorney, Agent, or Firm*—Wenderoth, Lind & Ponack

[57] ABSTRACT

This collector comprises a reflector (1) formed by a plurality of reflecting elements (6) engaged between consecutive frames (2). Each of the frames is formed by two members (7) moulded from Zanak and fixed to an aluminium beam (11) having a triangular cross-sectional shape. Each pair of members (7) defines arms (17) whereby the reflector is rotatively mounted on a fixed absorber tube (3). The latter is protected by a transparent hood (28) fixed on supports (4) disposed on each side of the reflector. A device (34, 35, 37) for adjusting the angular position of the reflector is provided at at least one end of the collector.

20 Claims, 11 Drawing Figures

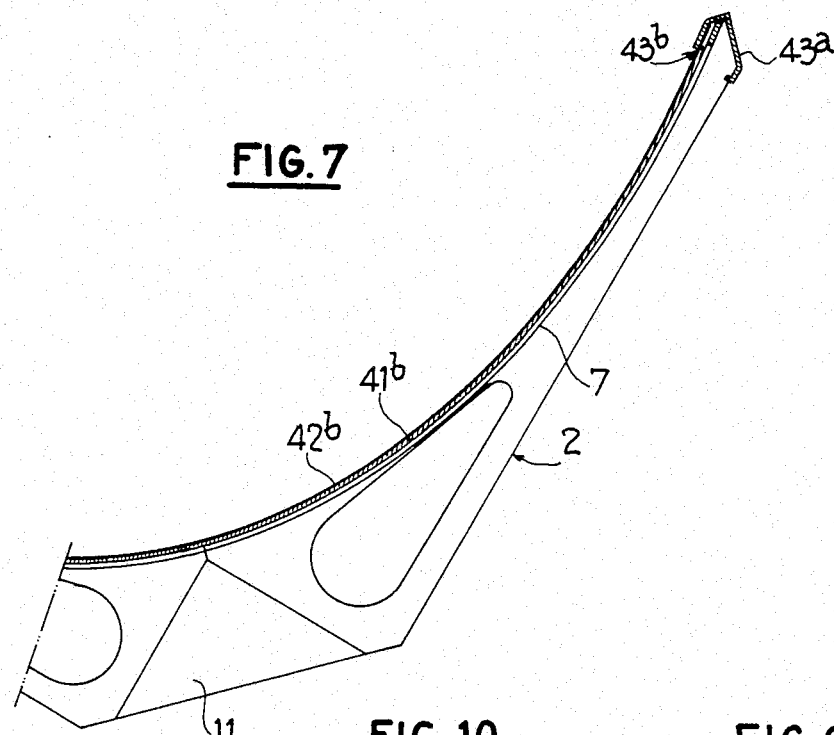
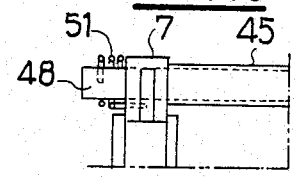
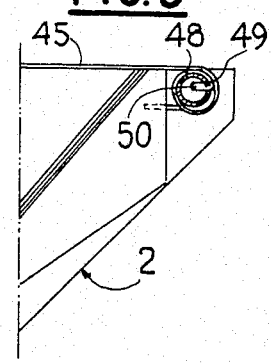
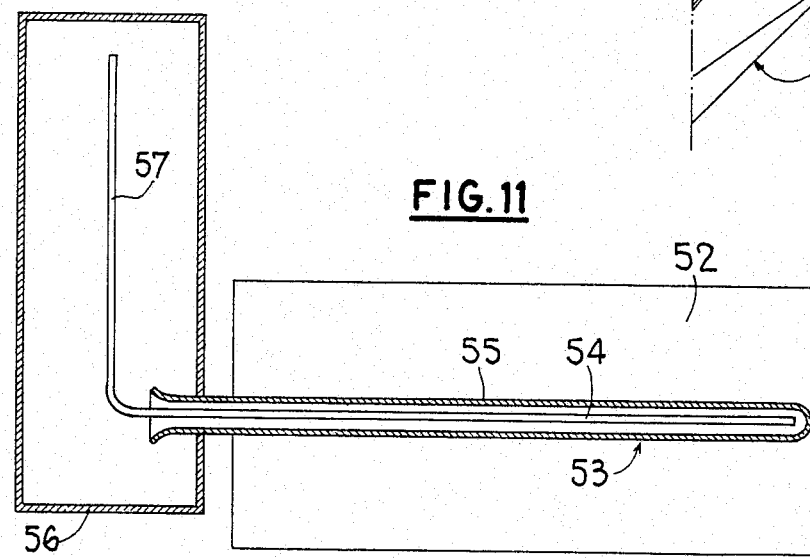

CYLINDRO-PARABOLICAL SOLAR ENERGY COLLECTOR

The present invention relates to solar energy collectors having a concave mirror and more particularly relates to collectors of the cylindro-parabolical type.

Collectors of this type are known which comprise a reflector of cylindro-parabolical shape and an absorber tube having an axis coincident with the focal line of the reflector and in which a heat transfer fluid circulates.

According to some known embodiments, the reflector is formed by sheets of reflecting material stiffened by frames.

A collector of the cylindro-parabolical type must be orientable in accordance with the direction of the sun.

In certain cases, the collector formed by the reflector and the absorber tube is mounted to be rotatable about the top of the reflector, which presents the drawback of requiring flexible connections between the absorber tube and the rest of the unit.

In other cases, the absorber tube is fixed and the reflector is mounted to be rotatable about the absorber tube.

This second arrangement enables the flexible connections between the absorber tube and the heat transfer fluid circuit to be eliminated.

Further, the movable part of the unit is lighter.

An object of the invention is to provide a solar energy collector which combines relative lightness with great simplicity of assembly.

Another object of the invention is also to provide a solar energy collector which may be mass-produced.

The invention therefore provides a solar energy collector comprising a concave reflector, a heat absorber tube disposed along the focal axis of the reflector, a heat transfer fluid circulating in said tube, said reflector being rotatably mounted about said heat absorber tube and being detachably mounted on said tube through pivot means surrounding said tube, said pivot means including at least one relatively movable locking element whose relative motion opens a radial passage for releasing the tube, thereby allowing the tube to remain in position without interruption of the flow of the heat transfer fluid.

Further features of the invention will be apparent from the ensuing description with reference to the accompanying drawings which are given solely by way of example and in which:

FIG. 7 is a partial sectional diagrammatic view of a modification of the reflecting material employed in the collector and of the manner in which it is assembled;

FIG. 9 is a partial view, to an enlarged scale relative to FIG. 7, of the means for putting the protective film under tension;

FIG. 10 is a partial elevational and sectional view of the tensioning means for the protective film of the collector of FIG. 8, and FIG. 11 is a diagrammatic view of an embodiment of the connection of the collector according to the invention with a storage tank employing coaxial pipes.

Figure 1:
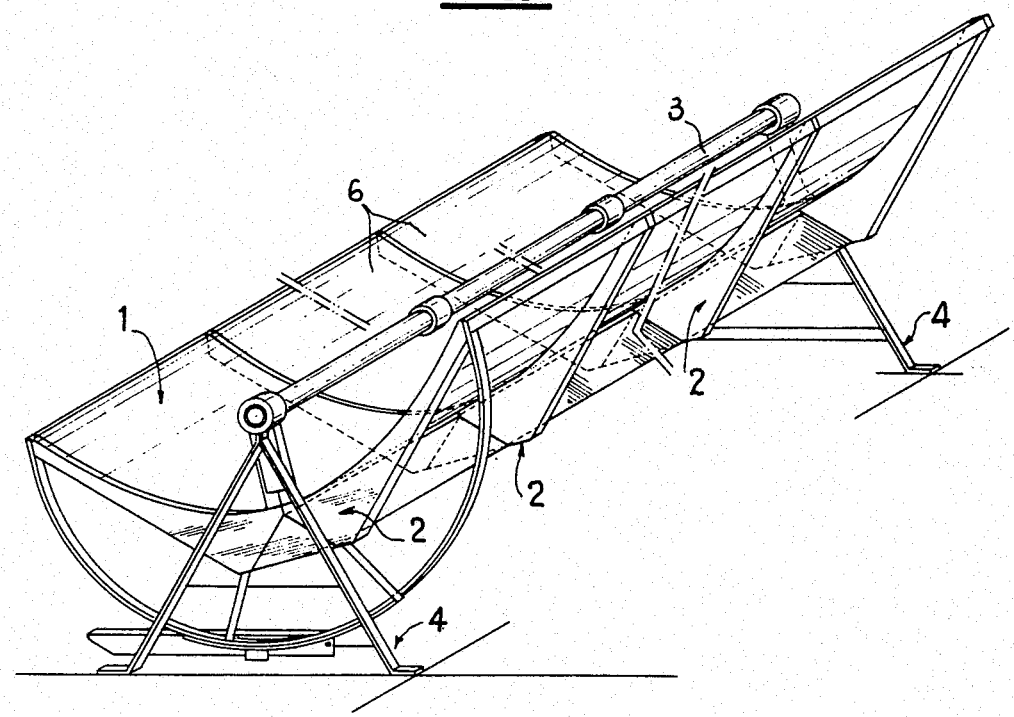
FIG. 1 is a diagrammatic perspective view of a solar energy collector according to the invention.

The solar energy collector shown in FIG. 1 comprises a trough-like cylindro-parabolical reflector 1 carried by frames 2 evenly spaced apart longitudinally of the reflector. A radiation absorbing tube 3, in which is adapted to circulate a heat transfer fluid, is disposed in such a manner that its axis coincides with the focal line of the reflector 1. At both ends, the tube 3 is mounted on fixed supports 4 the upper ends of which form collars 5. The collectors is rotatively mounted relative to the absorber tube 3 between the supports 4 in a manner which will be described in detail with reference to FIG. 2.

The reflecting surface of the reflector 1 is formed by juxtaposed elements 6 assembled by the frames 2.

Figure 2:
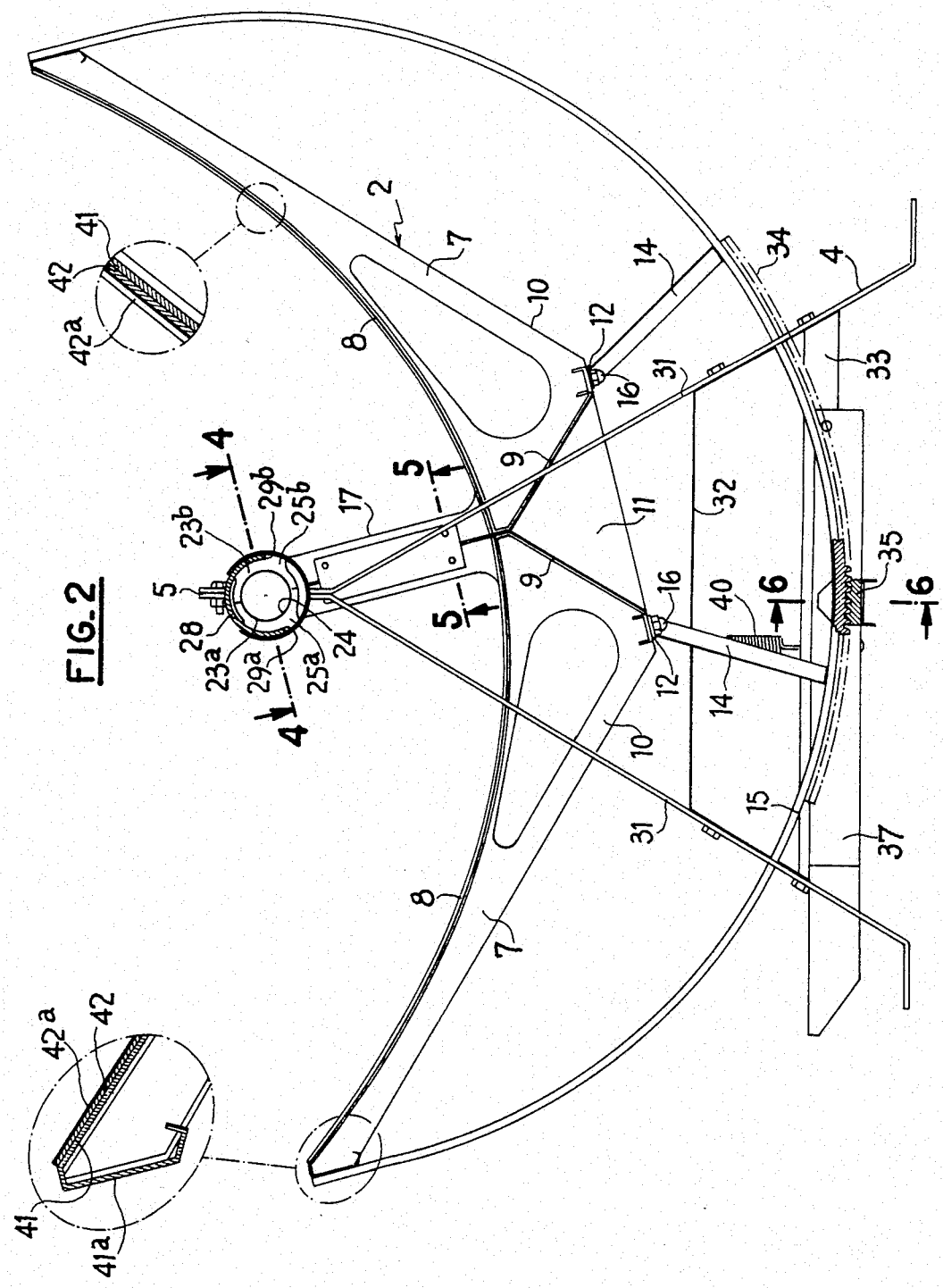
FIG. 2 is a side elevational view to an enlarged scale of the collector of FIG. 1.

Each of these frames is formed by two identical members 7 moulded for example from Zamak. Each member has a concave side 8 in the shape of a semi-parabola and two sides 9 and 10 disposed at a right angle. These members 7 adapted to form the parabolical framework for the reflecting surface bear in pairs as shown in FIG. 2 on a beam 11 of triangular cross-section, preferably made from aluminium. The beam 11 has lateral flanges 12 in which are formed apertures through which extend studs 13 provided at the apex of the L-shaped structure formed by the sides 9 and 11 of each member 7. The studs 13 also serve to fix struts 14 adapted to support a hoop member 15 whose ends are secured to the ends of the members 7 opposed to the beam 11. Tightening nuts 16 cooperate with the studs 13.

Figure 3:
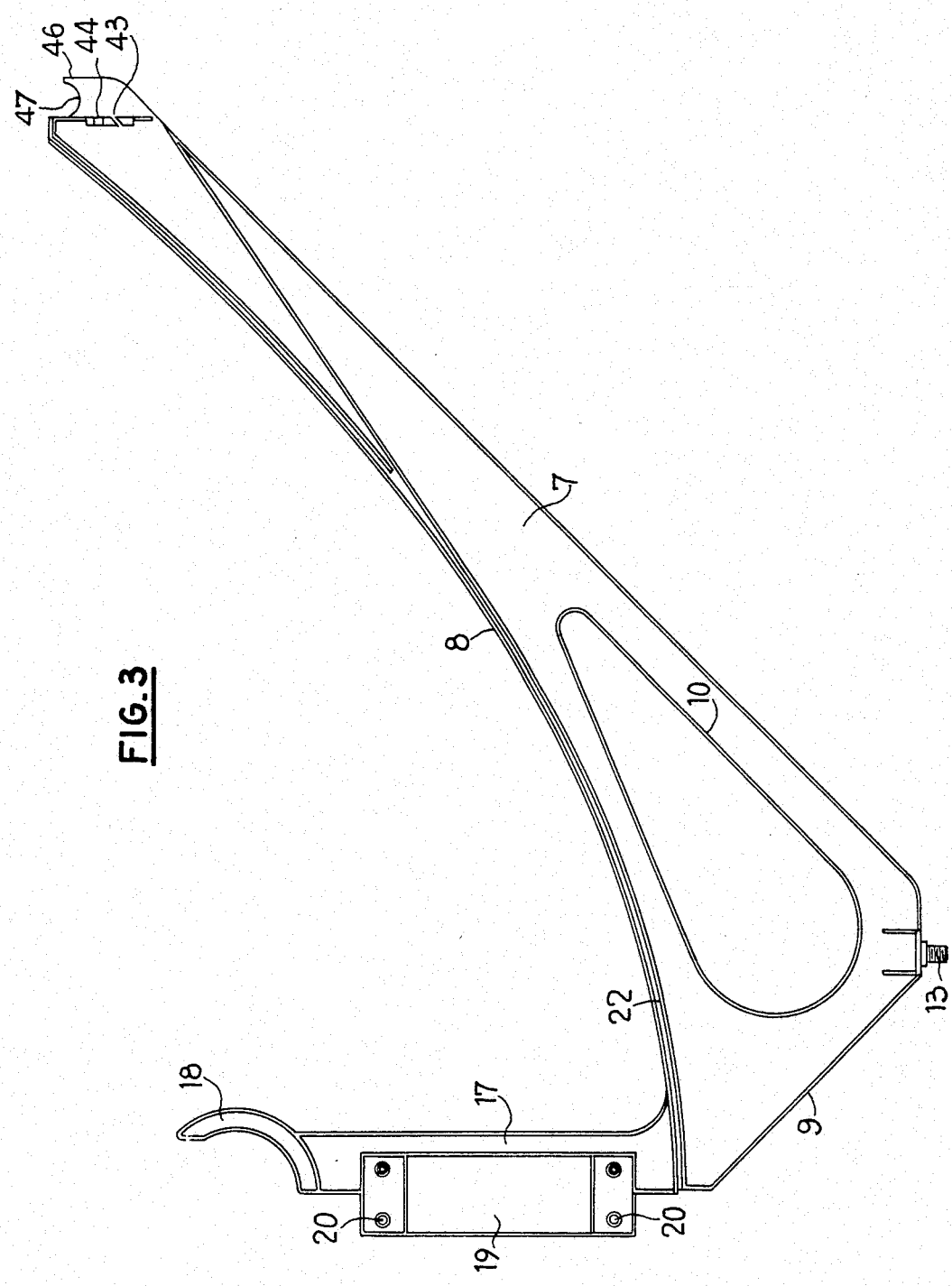
FIG. 3 is a view to an even greater scale of a frame element which is part of the construction of the collector according to the invention.
Figure 4:
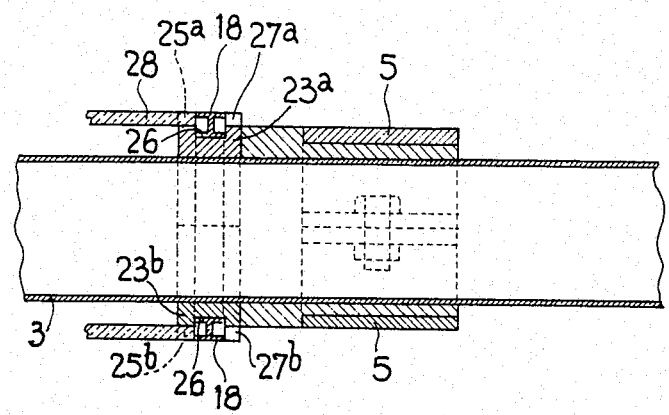
FIG. 4 is a partial sectional view taken on line 4—4 of FIG. 2.
Figure 6:
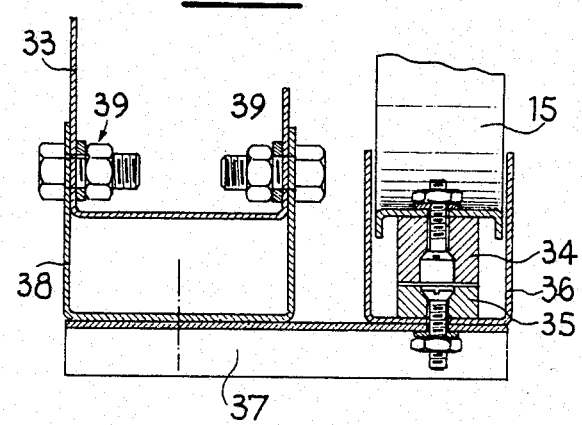
FIG. 6 is a partial sectional view taken on line 6—6 of FIG. 2.

With reference now to FIG. 3, it can be seen that each of the members 7 further comprises, moulded therewith, an arm portion 17 whose free end is constructed in the form of a portion of a circular ring 18 adapted to support the absorber tube 3 in a manner which will be described in detail with reference to FIG. 4.

Figure 5:
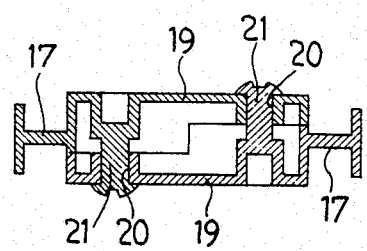
FIG. 5 is a sectional view taken on line 5—5 of FIG. 2.

As shown in FIG. 5, each arm portion 17 has a rectangular-shaped projecting portion 19 which is moulded therewith and inwardly overhangs. Formed in each projecting portion 19 are orifices 20 for receiving pins 21 provided in the arm portion 17 of the complementary member 7, the hammering-over of which pins ensures the assembly of said arm portions with respect to each other so as to form an arm connected to the tube 3.

On each side of its semi-parabolical sides, each member has a semi-parabolical groove 22 for receiving the edge portion of an element 6 of the reflector 1.

The absorber tube 3 is mounted in the open rings or forks constituted by the ends 18 of the arm portions 17 of the semi-parabolical members 7 assembled with each other, by means of a ring 23 comprising two semi-rings 23a, 23b engaged in the fork formed by the ends 18 of the arm portions 17, by rotation. The semi-rings 23a, 23b are made from an insulating material such as for example Teflon. They define a passage 24 of circular cross-sectional shape the inside diameter of which is equal to the absorber tube 3. The outside diameter of the ring thus formed is equal to the inside diameter of the part-circular shape of the inside of the fork formed by the ends or branches 18 of the arm portions 17. The rings, 23a, 23b have on their two end faces radially outwardly extending projections 25a, 25b which define therebetween a passage 26 whose width is equal to that of the ends 18 of the arm portions 17. The projections 25a and 25b extend in a portion of the periphery of the respective semi-rings 23a, 23b which subtends an angle at the centre of the ring 23 which is slightly less than the angle subtended by the opening or entrance of the fork 18, 18 at the centre of the fork corresponding to the centre of the ring 23 and the axis of the tube 3, so as to permit the engagement of the semi-rings in said fork through the opening or entrance of the latter. By thereafter successively turning each semi-ring 23a, 23b about the absorber tube 3 so that its respective projections 25a, 25b trap the curved ends or branches 18 of the arm portions 17, the reflector is locked on the absorber tube 3. The unlocking may be achieved just as easily by carrying out operations which are the opposite of those just described, so that the reflector is removable.

The semi-rings 23a, 23b further comprise in the projections 25a, 25b, portions 27a, 27b of smaller diameter which together define a bearing portion on which bears the end of a protective hood 28 of transparent material which caps the absorber tube 3. The hood 28 is of tubular shape and is open in the part thereof facing the reflector 8. The edges of the opening of the hood 28 bear against radial stops 29a, 29b constituted in the projections 25a, 25b by the hollowing-out of portions of bearing surfaces 27a, 27b for the hood 28.

The supports 4 of the collector are fixed to the absorber tube 3 by collars 5, by the clamping of said tube with interposition of a shouldered sleeve 30 of insulating material, such as Teflon. Each support 4 has the general shape of an A at the apex of which is provided the collar 5 which is defined by the upper ends of the legs 31 of the A. It comprises a first cross-member 32.

The cross-member of one of the supports is adapted to receive means for controlling the device adjusting the angular position of the reflector in accordance with the orientation of the sun.

This adjusting device comprises a rack 34 fixed on a portion of the hoop member 15 provided at at least one end of the collector. Cooperative with the rack 34 is a toothed member 35 which is fixed by means of a U-shaped guiding and protecting member 36 on an actuating lever 37. The lever 37 is pivoted to the cross-member 32 by a member 38 in the shape of a fork which surrounds the flanges of the cross-member 32 and which is secured to these flanges by bolt-and-nut assemblies 39. The actuating lever 37 is maintained in an upper position against the cross-member 32 by a return spring 40 whose ends are fixed, on one hand, to the lever 37, and, on the other hand, to the upper part of the cross-member.

If it is desired to render the adjustment of the orientation of the reflector automatic, the toothed member 35 may be replaced by a worm which would engage the rack 34 and would be driven an electric motor controlled by means responsive to the orientation of the sun.

The reflecting surface of the reflector is formed, as shown in the inset surrounded by the dot-dash line of FIG. 2 shown in the right part of this Figure, by the superimposition of a support sheet 41 made of metal or plastics and a metal sheet 42 forming a substrate for a film of reflecting material 42a constituted, for example, by an aluminized plastics material adhered to the sheet 42 forming a substrate. The support sheet 41 may be made in two parts of length corresponding to the curved sides 8 of each of the members 7 which constitute each frame, while the sheet 42 forming a substrate for the reflecting film 42 constitutes a single element inserted between two consecutive frames. The sheet 41 is folded at its ends over against the corresponding end of the member 7 and then inserted in a slot 43 formed in this member FIG. 3. As shown by the inset surrounded by a dot-dash circle shown at the left part of FIG. 2, the sheet 41 is thereafter immobilised by a screw engaged in screwthreaded holes 44 formed in the end of the member 7. The folded portions 41a of the sheet 41 thus form struts for stiffening and maintaining the frames.

In order to ensure that the reflecting film 42a retains a perfect condition in the vicinity of the parabolical groove 22, the film 42a is slightly narrower than the substrate 42 so that the lateral edge portions of the latter are devoid of reflecting film and are alone engaged with the sheet 41 in the parabolical groove 22, which avoids the formation of local creasing and tearing of this film upon assembly.

FIG. 7 shows a modification of the reflecting surface which may be employed for forming the reflector of the collector according to the invention.

According to this modification, the elements of the reflecting surface comprise a support element formed by a sheet 41b of stainless steel engaged in the grooves of two consecutive frames 2 and on which is adhered a film of reflecting material 42b, composed of aluminized plastics material.

The sheets 41b terminate in sharp edges and joint covers 43a are mounted at the free ends of the members 7 which constitute the frames 2. The joint covers, which perform the function of reinforcing beams for the reflector and spacer members, are formed by section members having an oblique passage 43b in which the lateral edge portion of the reflecting surface 41b, 42b is engaged.

The joint covers 43a thus also perform the function of longitudinal support means for the sheets 41b which prevent them from bending between two frames, and the function of protection means against humidity for the junction between the sheet 41b and the film 42b.

Figure 8:
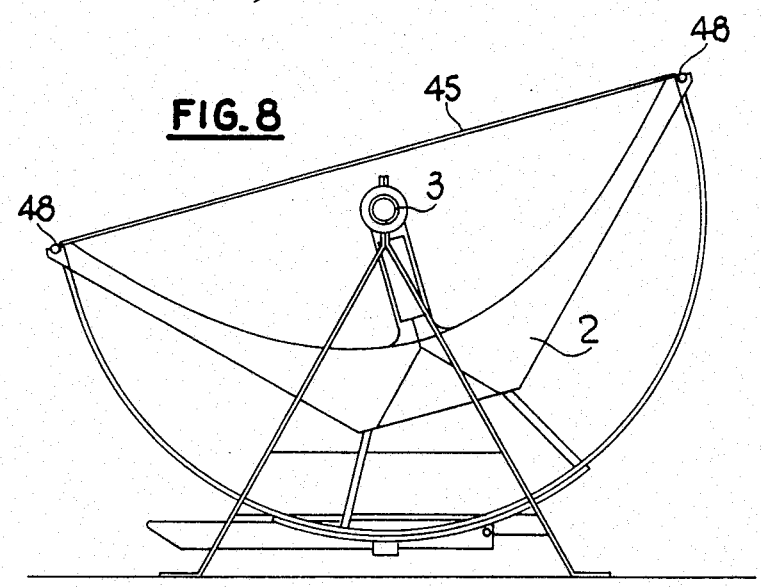
FIG. 8 is a diagrammatic side elevational view of the solar energy collector according to the invention which is protected by a film of plastics material.

FIG. 8 shows an embodiment of the solar energy collector according to the invention in which the reflector and the absorber tube are protected by a transparent film 45 held taut on the frame that the assembly of the frames 2 and the flanges of the supporting sheets 41 of the reflector constitute. In order to mount this film 45, the free ends of the members 7 which constitute the frames are each provided with an outer projection 46 in which is formed a groove 47 for receiving a rod 48 which constitutes the tensioning member of the film 45. Thus, the film 45 may easily be mounted and disassembled either for replacing or for gaining access to the reflector or the absorber tube.

The means for mounting the film 45 are shown in more detail in FIGS. 9 and 10. As shown in FIG. 9, each rod 48 comprises a longitudinal slot 49 in which the edge portion of the film 45 is passed, this edge portion having a beading 50 whose thickness exceeds the width of the slot 49, this beading being formed by the welding together of a plurality of thicknesses of film. The latter is wound at least once round the rod 48.

At least one of the rods 48 is provided, as shown in FIG. 10, with tensioning means 51 which may be formed a coil spring which is under torsional stress and is mounted at one end of the rod 48, one end of the spring being engaged in an orifice provided in the rod while the other end is rigid with the corresponding member 7. The mounting is achieved by putting the spring under a given stress and it will be understood that any variation in the length of the film 45 due to its expansion or contraction is compensated for by the rotation of the rod 48 under the action of the spring 51.

The solar energy collector just described has, relative to similar devices of the prior art, the advantage of being extremely easy to assemble owing to the simplicity of the component parts.

The fact that the frames 2 are made from moulded members assembled with a central stiffening and supporting beam, ensures a good reproducibility of manufacture, which is very important in production on an industrial scale.

The fact that the reflector can be easily removed from the absorber tube permits a rapid replacement of defective parts.

In the embodiment just described, the absorber tube is formed by a single tube in which the heat transfer fluid circulates. However, it is possible to arrange the absorber tube in the form of two concentric tubes, the central tube serving to circulate the hot water, while the peripheral tube defines with the outer surface of the central tube a passageway in which the cold water circulate.

Such an arrangement is shown in FIG. 11. In the latter, the collector 5 according to the invention, shown diagrammatically at 52, comprises an absorber tube 53 formed by an inner tube 54 and an outer tube 55 coaxial with the tube 54 and surrounding the latter. The outer tube 55 constitutes the tube supplying cold water and is connected to the lower part of a tank 56, while the tube 54 constitutes the hot water return tube and is connected to the upper part of the tank 56. For this purpose, it has a section 57 inside the tank.

Such an arrangement permits the operation of the unit as a thermo-siphon.

Further, it considerably reduces the lengths of the pipes and consequently thermal losses.

Owing to its simplicity of assembly the solar energy collector according to the invention may be supplied completely dismantled and it may be assembled on the spot with no need for very qualified labour. The collector of FIG. 11 may also have a central cold water supply tube connected to the lower part of the tank and a peripheral tube for discharging hot water connected to the upper part of the tank.

Having now described our invention what we claim as new and desire to secure by Letters Patent is:

1. A solar energy collector comprising a trough-like concave reflector having an axis through the focus of the reflector, a heat absorber tube disposed along and coincident with said axis, a heat transfer fluid circulating in said tube, pivot means pivotably and detachably mounting said reflector on said heat absorber tube, said pivot means comprising frames carrying the reflector and spaced apart along said axis, each frame including an arm having an end portion defining a fork which has two spaced-apart branches defining an opening and an entrance to said opening which is narrower than said opening for receiving and removing said tube in a direction radially of said axis and releasable locking means engaged in said opening for retaining said tube in said opening, said locking means comprising, for each fork, ring means having an inside diameter for receiving said tube and an outside shape which is such as to enable the ring means to be engaged inside said opening of the respective fork in a first rotational position of the ring means relative to the fork and to lock the ring means in the fork after rotation of the ring means about said axis to a locking position, said ring means being releable from the fork by rotation of the ring means from said locking position to said first rotational position thereof.

2. A collector according to claim 1, wherein said end portion of each arm defines a partly annular fork partly surrounding the absorber tube, said opening is part-circular, said entrances has a width less than the diameter of said part-circular opening, and said ring means has an outside diameter such as to enable the ring means to fit in said part-circular opening.

3. A collector according to claim 1, wherein the reflecting surface of the reflector comprises sheet elements covered with a film of aluminized plastics material, and having edge portions engaged in confronting grooves of two consecutive frames, ends of said elements being engaged in passageways provided in joint covers which form reinforcing struts for longitudinal edge portions of the reflector and are fixed to free ends of said members forming said frames.

4. A solar energy collector comprising a concave cylindro-parabolical reflector having an axis through the focus of the reflector, a heat absorber tube disposed along and coincident with said axis, a heat transfer fluid circulating in said tube, pivot means pivotably and detachably mounting said reflector on said heat absorber tube, said pivot means comprising frames carrying the reflector and spaced apart along said axis and including arms, each arm having an end portion in the shape of a partly annular fork partly surrounding the absorber tube and defining an opening and an entrance to said opening for receiving and removing said tube in a direction radially of said axis, and a releasable locking element of an insulating material engaged in said openings for locking each fork on the tube, said locking element comprising a ring formed by two semi-rings each of which semi-rings comprises on opposite sides thereof projections which define therebetween a passage whose width is equal to the thickness of the respective fork, said projections extending in a portion of the periphery of the ring which is slightly smaller than said entrance defined by the respective partly annular fork.

5. A collector according to claim 4 wherein each frame comprises two identical members of moulded metal, each of which members has a curved side defining the shape of the reflector, said members being assembled in pairs so that the curved sides are in the extension of each other.

6. A collector according to claim 3, wherein the reflecting surface of the reflector comprises sheet elements covered with a film of aluminized plastics material and having edge portions engaged in confronting grooves of two consecutive frames, ends of said elements being engaged in passageways provided in joint covers which form reinforcing struts for longitudinal edge portions of the reflector and are fixed to free ends of said members forming said frames.

7. A collector according to claim 4, comprising supports disposed on each side of the reflector, on which supports the absorber tube is mounted, and means for adjusting the angular position of the reflector relative to said supports.

8. A collector according to claim 7, wherein the means for adjusting the angular position of the reflector comprise a hoop member fixed to at least one end of the reflector, a rack mounted on said hoop member, a toothed member cooperative with the rack, a lever pivotally mounted on the corresponding support and carrying the toothed member, and elastically yieldable return means for biasing said lever in a direction to maintain the toothed member engaged with the rack.

9. A collector according to claim 5, comprising a film of transparent material held taut on edges of the reflector for protecting the reflector.

10. A collector according to claim 9, wherein each of the members which form said frames has, at a free end thereof, a projection provided with a groove for receiving a rod for tensioning said film which is wound round said rod, means for maintaining said film under tension being associated with at least one of the rods.

11. A collector according to claim 4, wherein the absorber tube comprises a central tube and a peripheral tube coaxial with and defining with the central tube a passageway for the supply of cold water or discharging hot water, while the central tube forms a pipe discharging hot water or supplying cold water.

12. A collector according to claim 11, comprising a storage tank to which the collector is connected, the central tube being connected to one of upper and lower parts of the tank while the peripheral tube is connected to another of said upper and lower parts of the tank.

13. A solar energy collector comprising a troughlike concave reflector having an axis through the focus of the reflector, a heat absorber tube disposed along and coincident with said axis, a heat transfer fluid circulating in said tube, pivot means pivotably and detachably mounting said reflector on said heat absorber tube, said pivot means comprising frames carrying the reflector and spaced apart along said axis and including arms having end portions defining openings for receiving and removing said tube in a direction radially of said axis, and releasable locking means engaged in said openings for retaining said tube in said openings, said reflector being of cylindro-parabolical shape, said end portions of said arms defining a partly annular fork at the end of each arm and surrounding the absorber tube, and said locking means comprising an element of an insulating material locking each fork on the absorber tube, each frame comprising two identical members of moulded metal, each of which members having a curved side defining the shape of the reflector, said members being assembled in pairs so that the curved sides are in the extension of each other.

14. A collector according to claim 13, wherein each of the members which form in pairs said frames comprises an arm portion terminating in an end portion in the shape of a portion of a ring and comprising means for assembling with complementary assembling means provided on the other of said arm portions, the assembly of the two arm portions of two juxtaposed members constituting said arm connected to the absorber tube.

15. A collector according to claim 14, wherein said assembling means are moulded in one piece with said member.

16. A collector according to claim 13, wherein said members constituting a frame each comprise at least one rectilinear side, by which side they are assembled with a beam of triangular cross-sectional shape comprising lateral flanges, each member being fixed to the beam by fixing means cooperative with the corresponding flange of the beam.

17. A collector according to claim 13, wherein each of said members constituting said frames has on each side of its curved side a groove of parabolical shape, and an element of reflecting material having an edge portion is received in said groove so as to define the surface shape of the reflector.

18. A collector according to claim 13, wherein the reflecting surface of the reflector comprises supporting sheet elements having edge portions engaged in confronting grooves of two consecutive frames, ends of said sheet elements facing outwardly being folded so as to form reinforcing struts fixed to free ends of the members forming said frames, a sheet forming a substrate covered with a film of aluminized plastics material being superimposed on said supporting elements.

19. A solar energy collector comprising a troughlike concave reflector having an axis through the focus of the reflector, a heat absorber tube disposed along and coincident with said axis, a heat transfer fluid circulating in said tube, pivot means pivotably and detachably mounting said reflector on said heat absorber tube, said pivot means comprising frames carrying the reflector and spaced apart along said axis and including arms having end portions defining openings for receiving and removing said tube in a direction radially of said axis, and releasable locking means engaged in said openings for retaining said tube in said openings, said reflector being of cylindro-parabolical shape, said end portions of said arms defining a partly annular fork at the end of each arm and surrounding the absorber tube, and said locking means comprising an element of an insulating material locking each fork on the absorber tube, said collector further comprising a protective hood of transparent material which caps the absorber tube.

20. A collector according to claim 19, wherein said hood comprises a tube open in the direction of the reflector and bearing on bearing surfaces of said locking elements and prevented from rotating by radial stops provided on said locking elements.

* * * * *